US006640225B1

(12) United States Patent
Takishita et al.

(10) Patent No.: US 6,640,225 B1
(45) Date of Patent: Oct. 28, 2003

(54) SEARCH METHOD USING AN INDEX FILE AND AN APPARATUS THEREFOR

(75) Inventors: Nobuaki Takishita, Sagamihara (JP); Takako Suzuki, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 09/676,803

(22) Filed: Sep. 29, 2000

(30) Foreign Application Priority Data

Sep. 30, 1999 (JP) ............................................ 11-277978

(51) Int. Cl.⁷ ................................................ G06F 17/30
(52) U.S. Cl. ................................................ 707/5; 707/3
(58) Field of Search ........................... 707/1, 2, 5, 102, 707/3

(56) References Cited

U.S. PATENT DOCUMENTS

| | | | | |
|---|---|---|---|---|
| 5,745,894 A | * | 4/1998 | Burrows et al. ................ | 707/5 |
| 6,317,741 B1 | * | 11/2001 | Burrows ........................ | 707/5 |
| 6,427,147 B1 | * | 7/2002 | Marquis ........................ | 707/4 |
| 6,460,047 B1 | * | 10/2002 | Ambroziak ................. | 707/102 |

* cited by examiner

*Primary Examiner*—Safet Metjahic
*Assistant Examiner*—Haythim J. Alaubaidi
(74) *Attorney, Agent, or Firm*—Gail H. Zarick; Anne V. Dougherty

(57) ABSTRACT

A search method that uses an index file consisting of a key file that includes key character strings, and a position data file that includes position data corresponding to the key character strings, a position data delete flag is correlated with a specific key character string, and position data that correspond to the specific key character string are deleted from the position data file. Where A denotes the size of an index at which the contents of the position data file are to be deleted, B denotes the amount of position data for each keyword that is to be deleted at that time, and C denotes the amount of position data for a keyword that is to be deleted because the data can not be employed for the search. When (1) the size of the overall index file reaches A for the first time, a position data delete flag is set that corresponds to a key character string for which the amount of the position data is equal to or greater than B while the position data are deleted from the position data file; and/or when (2) the size of the entire index file exceeds A, a position data flag is set that corresponds to a key character string for which the amount of position data is equal to or greater than C, and the position data are deleted from the position data file.

20 Claims, 9 Drawing Sheets

| KEYWORD | POSITION IN POSITION DATA FILE | THE AMOUNT OF POSITION DATA | POSITION DATA DELETE FLAG |
|---|---|---|---|
| FORUM | N/A | 3000000 | YES |
| JAVA | 500 | 4000 | NO |
| PC | 5000 | 200 | NO |
| SQL | 8000 | 400 | NO |

FIG.2

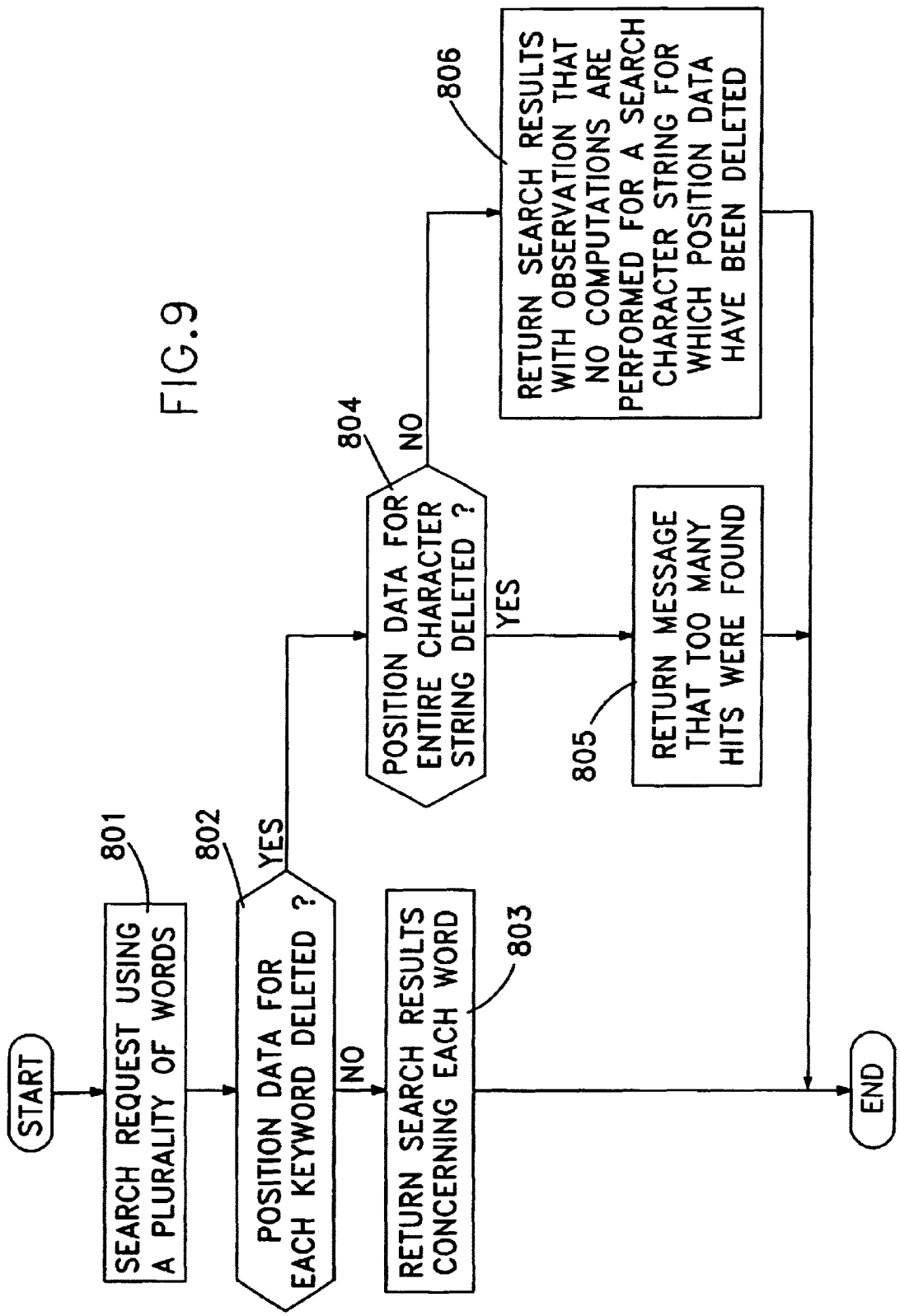

SEARCH METHOD USING AN INDEX FILE AND AN APPARATUS THEREFOR

FIELD OF THE INVENTION

The present invention relates to a search method that uses an index file that is composed of a key file, including key character strings, and a position data file, including position data that correspond to key character strings, and to an apparatus used for the search method.

BACKGROUND OF THE INVENTION

In order to quickly search for in-house document data or a home page on the Internet, conventionally, an index is prepared for character strings that appear in documents that are sought, and then an all-sentences search is conducted, based on the index, to examine all available documents for the desired character string, or document. The importance of such a search is acknowledged; however, with time, the amount of data searched for increases, and since the search index is thereby expanded, the required hard disk space may grow until it is almost prohibitively large. Further, for an all-sentences search, all character strings for which search requests are submitted must be included, and a corresponding index be prepared. Thus, again, the size of the index increases, and as it does, so too does the size of the obtained results; and this makes it difficult for a user to find a desired document. Furthermore, unsuccessful searches, for character strings for which positive results are not obtained, may occur due to an existing system/resources relationship.

The following two conventional methods are well known techniques employed to reduce the size of index files, and thus resolve the above problems. For the first method, a stop word system is employed. According to this method, a list is prepared of words such as THIS, A and THE in English, for example, that seem to be most frequently used, and these words are not included in an index file. For the second method, a compressing scheme is used to reduce the size of the index information.

Although the stop word method and the compression method can reduce the size of an index file, the following shortcomings make them less effective.

For the stop word method:

Although the amount of information included for a character string that is frequently used can be reduced, once an index for FORUM has been prepared, information can not be deleted for a word, such as FORUM or APPENDED, that appears more frequently and is inherent to an index, and that is not searched for using the pertinent index.

Since stop words are inherent to a language, stop words that are unique to a pertinent language must be selected.

Although a stop word may be included in a string for which a search request is submitted, data relative to the stop word is always deleted, and can not be searched for.

If the number of words that can be handled by a system is set, and there is an increase in the size of an index that causes it to exceed the limit, even though a large number of search results may be obtained, a search will be interrupted and the system will be adversely affected, because with the stop word method, index information that is not needed for a search can not be deleted.

For the compression method:

Although the size of the index can be reduced by data compression, the index information that is not actually required for a search can not be deleted.

A technique for eliminating inefficient searches and useless search results is disclosed in Japanese Unexamined Patent Publication No. Hei 10-171692. However, this technique involves the deletion, from a search index, of very common words that are located at the ends of the index terms, and provides an approach that differs from the method for reducing the size of a position data file that constitutes a problem when an index for an all-sentences search is prepared.

To resolve the above shortcomings, it is one object of the present invention to provide a search method using an index file, whereby the size of an index file can be considerably reduced, and an apparatus that is to be used for the search method.

SUMMARY OF THE INVENTION

A search method according to the present invention that uses an index file is a method for using an index file consisting of a key file, which includes key character strings, and a position data file, which includes position data corresponding to the key character strings. According to this search method, a position data delete flag is correlated with a specific key character string, and position data that correspond to the specific key character string are deleted from the position data file. In one preferred aspect, the position data is deleted when a position data size, corresponding to the specific key character string, is attained that with the position data file size provides a specific ratio. Furthermore, the position data is also deleted when the size of the position data reaches a specific value that corresponds to the specific key character string.

An apparatus used for the search method of the present invention comprises: a new difference index preparation unit for preparing a new difference index file using a newly registered document; an index merge unit for merging a conventional index file with the new difference index file prepared by the new difference index preparation unit, for determining whether the above described position data file is to be deleted, and for preparing a new index file; and a search unit for beginning a search based on the new index file generated by the index merge unit.

According to the present invention, the position data delete flag is correlated with a specific key character string, and the position data that corresponds to the specific key character string is deleted from the position data file. Therefore, while a request for an all-sentence search is satisfied, the position data for a character string that can not actually be employed for a search can be deleted, so that a considerable reduction in the size of an index file can be realized.

In another preferred aspect, the structure of a key file is constituted by a key character string, the location of the key character string in the position data file, the size of the position data, and the position data delete flag. A group of key character strings is specified in advance, for which position data are not to be deleted, even though it has been determined that the position data are to be deleted. When the position data delete flag, corresponding to a specific key character string, is set, position data for the key character string is not added to the position data file for the index file. When the position data delete flag, corresponding to a specific key character string, is not set, position data for the key character string is added to the position data file for the index file. A search is to be performed by a method that uses a search key character string consisting of one word, a method that uses one search key character string when an index is prepared using the N gram method, or a method that uses using a search key character string consisting of a plurality of words. All of these methods can appropriately carry out the present invention.

BRIEF DESCRIPTION OF THE DRAWINGS

The invention will now be described in greater detail with reference to the appended figures wherein:

FIG. 2 is a diagram showing the structure of a key file in FIG. 1.

FIG. 9 is a flowchart showing a search process performed when a search character string consists of a plurality of words.

DETAILED DESCRIPTION OF THE INVENTION

In this invention, a search method is employed whereby an index file is used that consists of a key file, which includes key character strings, and a position data file, which includes position data that correspond to the key character strings. First, the structures of the index file and the key file will be described.

Figure 1:
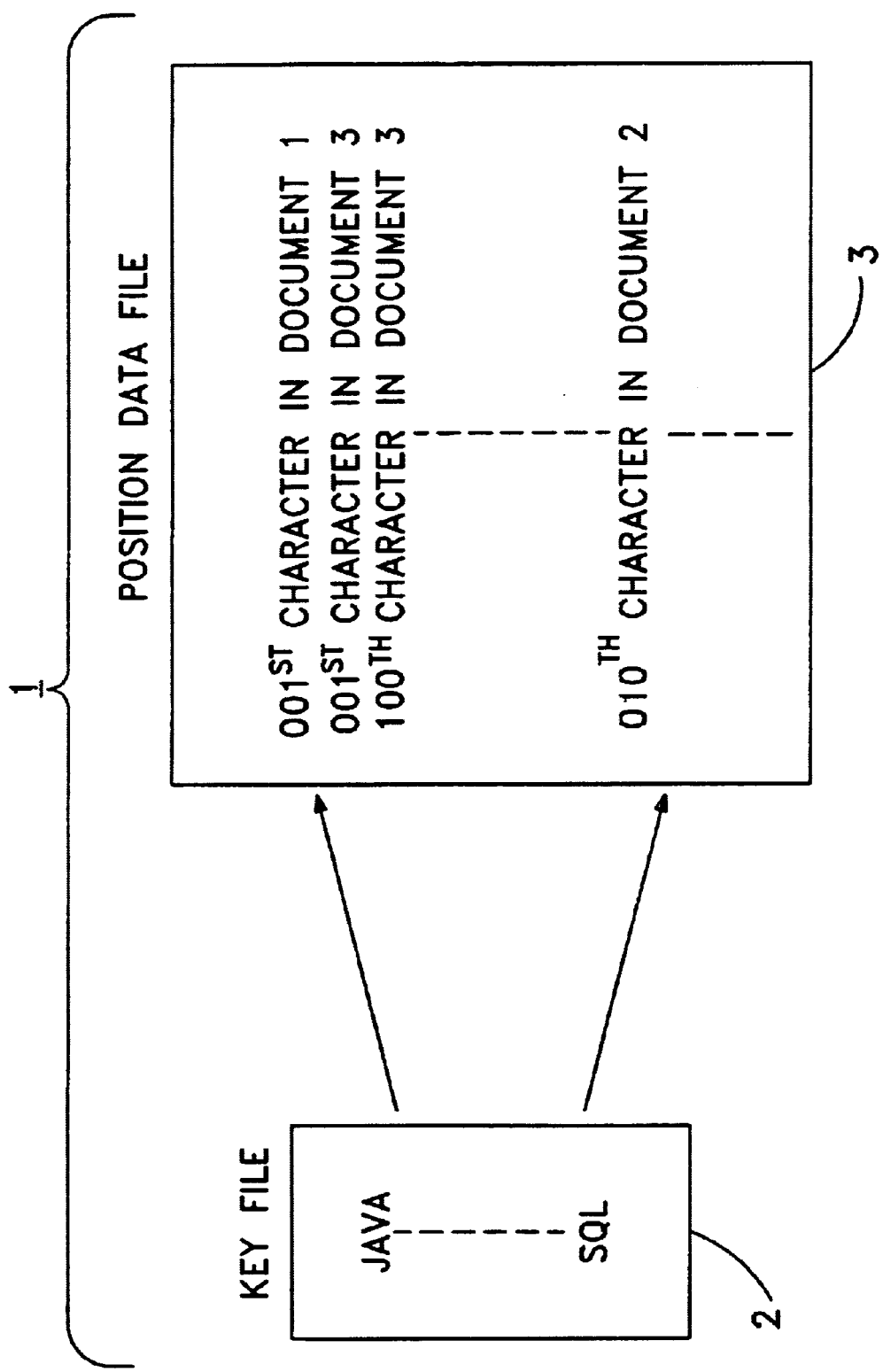
FIG. 1 is a diagram showing the structure of an index file used to carry out a search method according to the present invention.

FIG. 1 is a diagram showing the structure of an example index file that is used to carry out the search method of the present invention. In FIG. 1, an index file 1 consists of a key file 2 and a position data file 3. The key file 2 includes keywords, such as JAVA and SQL, and information associated with these keywords. The position data file 3 includes all the locations recorded for each keyword in the key file 2. For example, the keyword "JAVA" occupies the 001 st character position in document 1 and the 001 st and 100 th character position in document 3, and the keyword "SQL" occupies the 010 th character position in document 2.

FIG. 2 is a diagram showing an example structure for the key file 2 in FIG. 1. In FIG. 2, the key file 2 consists of keywords 4, position data file locations 5, position data sizes 6, and position data delete flags 7. The key file 2 holds data describing pertinent portions of the position data file 3 that in turn hold information describing the documents in which the keywords 4 can be found and the positions in the documents that are occupied by the keywords 4. As can be determined from the example structure, for the keyword "JAVA," for example, a location 500 in the position data file holds 4000 entries and the position data delete flag is set to "NO," which indicates that this keyword is to be employed for a search. In like manner, for the keyword "FORUM," since the position data delete flag is set to "YES," it is evident that for this keyword no position data is available that can be used during a search, while from the "N/A" entry it can be inferred that no storage location has been allocated for the position data. Note in that the key file 2 the keywords 4 are arranged in alphabetical order.

According to this invention, the index file 1 used for the search consists of the key file 2 and the position data file 3 described above. As the size of the index file 1 increases, the size of the key file 2 changes very little, but the position data file 3 grows in consonance with the index file 1, so that the ratio of the position data file 3 to the index file 1 is constantly increasing. When the size of the index file 1 reaches a specific level, e.g., 20 MB or 100 MB, and efficient management of the index file 1 is not possible, or even in cases where efficient management of the index file 1 is possible, since so many keywords are entered, during a search the processing of meaningless keywords will occur. Therefore, in this invention, the delete flag is set for such keywords, so that locations in the position data file 3 that correspond to the keywords are deleted and the size of the index file 1 is reduced. This method will now be described.

Figure 3:
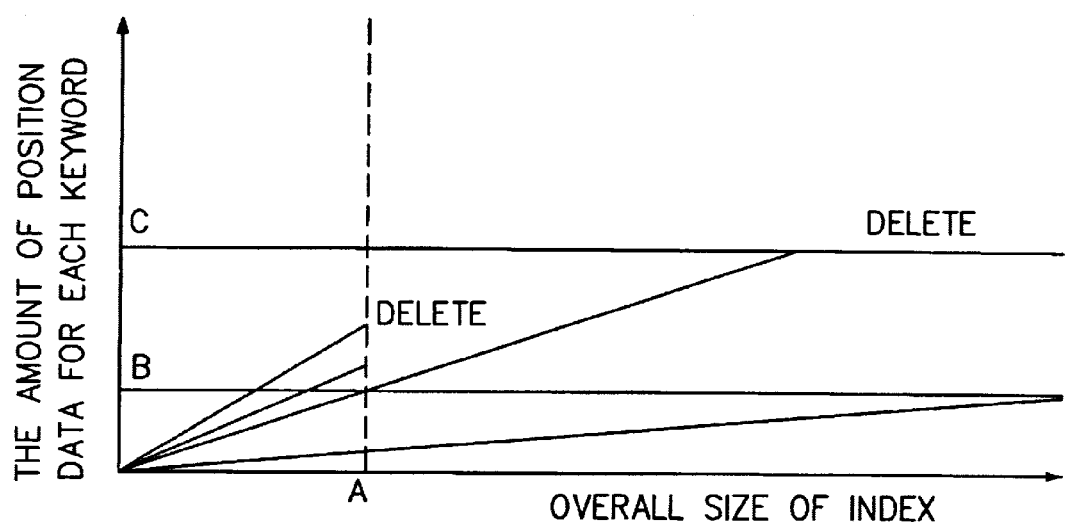
FIG. 3 is a graph showing the relationship between the size of an overall index file and the amount of position data for each key character string.

FIG. 3 is a graph showing the relationship between the overall size of an index file 1 and the amount of position data acquired for each keyword 4. In FIG. 3, if A: the size at which an index file in which the position data file 3 contents that are to be deleted are indicated, if B: the amount of position data that is being held for the keywords that are to be deleted at that time, and if C: the amount of position data being held for several keywords that are to be deleted because the data can not be employed for a search, there are two points at which the position data stored in the position data file 3 are deleted. First, there is the time at which the overall size of the index file reaches A. Since a request to search for all character strings is issued for an all-sentences search, the search for position data file 3 contents continues, and no contents are deleted until the size of the index file reaches A, 20 MB, for example. According to the graph, wherein the horizontal axis represents the total size of the index file and includes a portion that is to be deleted, when the size of the index file reaches A, only the amount of position data that is equal to or greater than B, e.g., only the position data for character strings that occupy space at a ratio to the size of the index file of 0.1% or greater, are deleted (straight/linear lines a and b in FIG. 3). This is the first time the deletion of position data is performed. Then, the deletion of position data is again performed when the size of the index file exceeds A, and the amount of position data obtained during the search that can not actually be used, because of the system resources or because too many hits were recorded during the course of the search, reaches the amount represented by C (straight/linear line c in FIG. 3).

Figure 4:
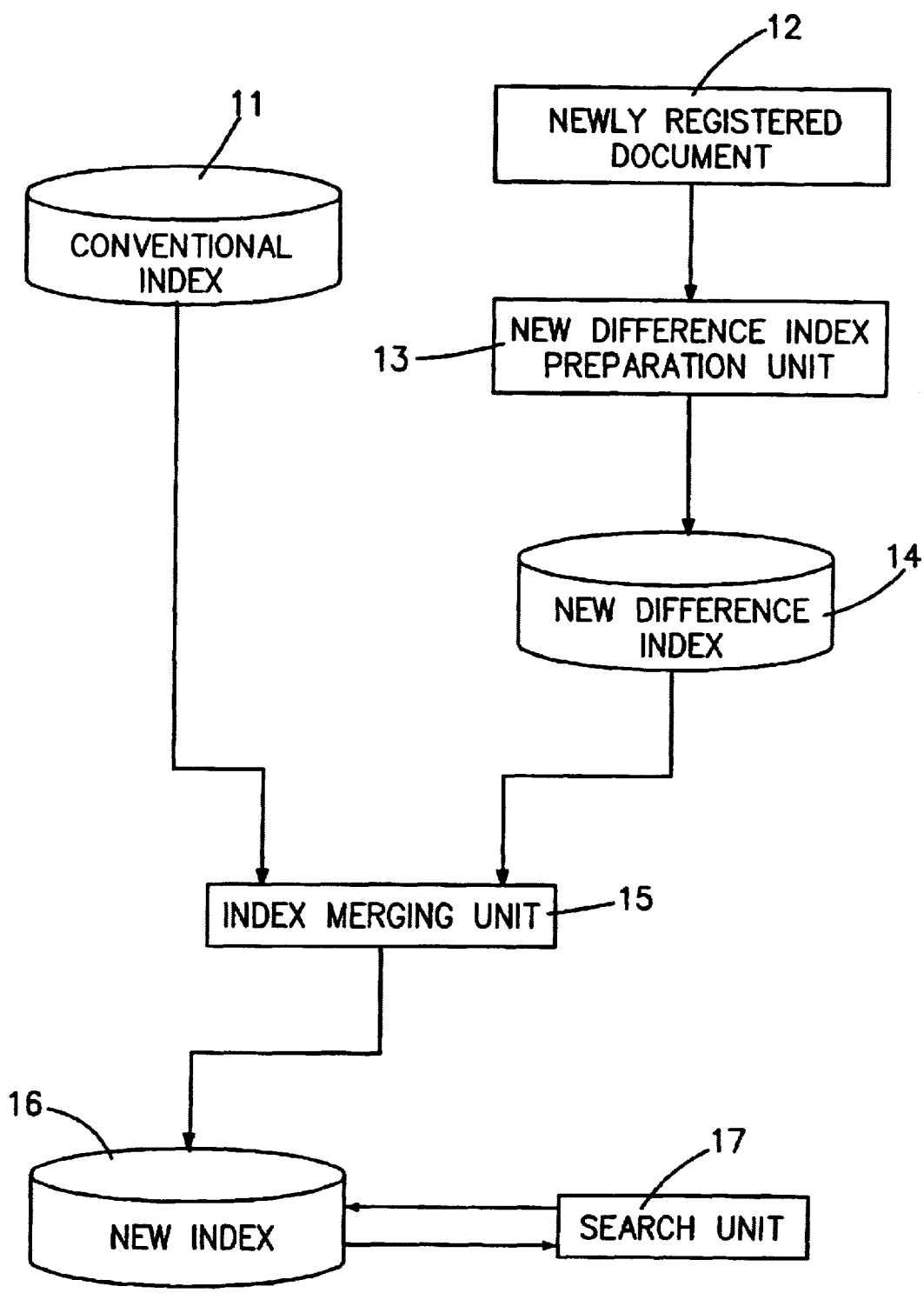
FIG. 4 is a block diagram illustrating the arrangement of an apparatus used for the search method that employs the index file of the present invention.

An apparatus that is used for the search method and that employs the index file of the present invention will now be described. FIG. 4 is a block diagram illustrating the arrangement of an example apparatus used for the search method that employs the index file of this invention. In FIG. 4, the apparatus comprises: a new difference index preparation unit 13, for preparing a new difference index file 14 from newly registered documents 12; an index merging unit 15, for merging a new difference index file 14 prepared by the new difference index preparation unit 13 and a conventional index file 11 and preparing a new index file 16, and for determining whether the above described position data file should be deleted; and a search unit 17, for executing an all-sentences search based on the new index file 16 that is prepared by the index merging unit 15.

The individual units will now be described in detail. First, the conventional index file 11 is the last one that has currently been prepared. Normally, for an all-sentences search data is added to the index each time the number of original documents is increased. The newly registered document 12 is comprises the most recently registered document group. The new difference index preparation unit 13 defines, as the new difference index file 14, a new difference that is registered, and assembles the file 14 using a structure corresponding to that of the index structure, so that the new difference index file 14 and the conventional index file 11 can be merged at the next step. The index merging unit 15 prepares a new index file 16 by combining the conventional index file 11 and the new difference index file 14 that is prepared by the new difference index preparation unit 13, and determines whether the position data file of the present invention should be deleted. The new index file 16, which is output by the index merging unit 15, is the one that is thereafter used to perform a search. Later, when the search unit 17 receives a search character string entered by a user, it searches the new index file 16 to find a document in which the pertinent character string is included.

Figure 5:
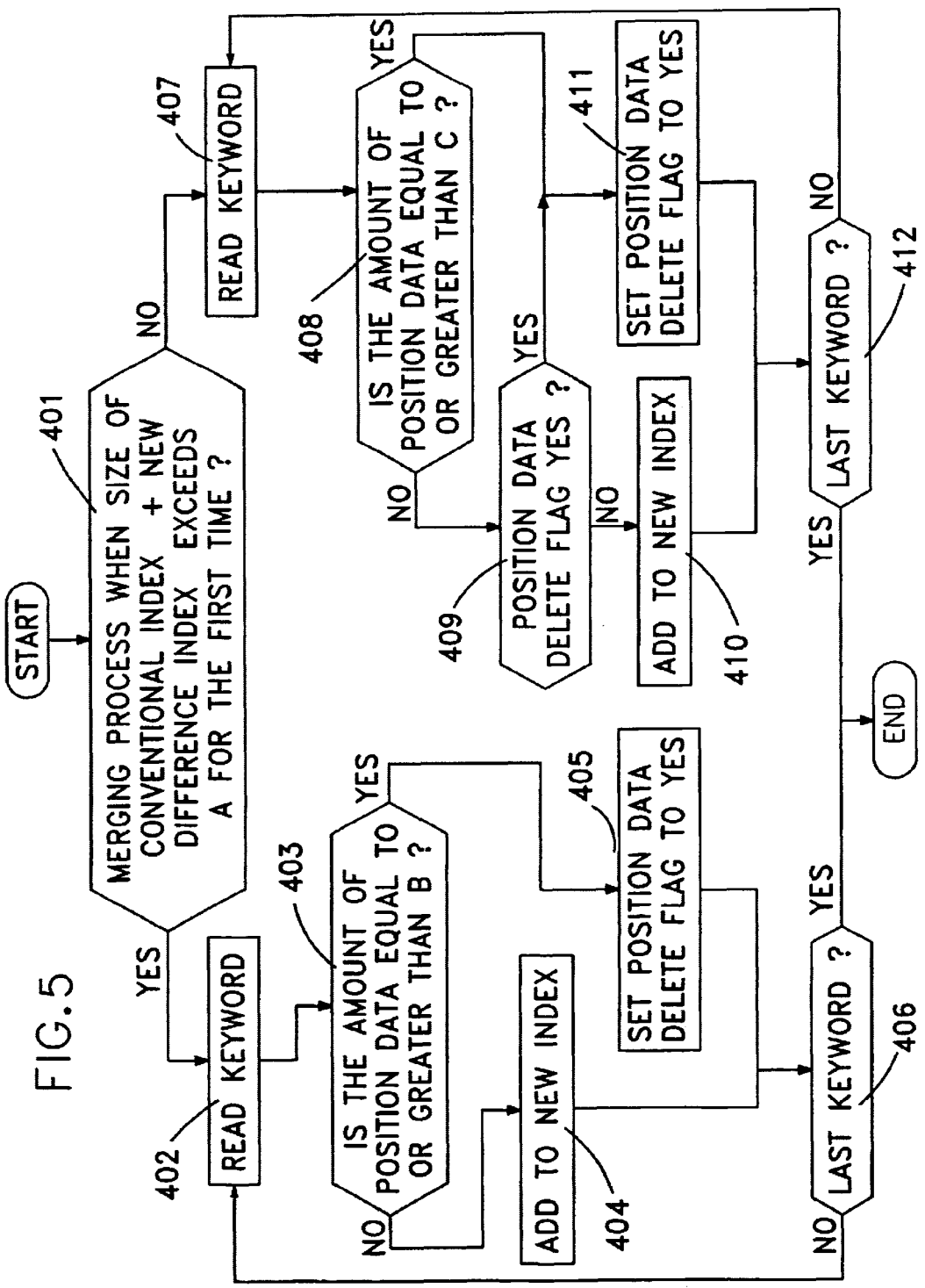
FIG. 5 is a flowchart for explaining the position data deleting process performed by an index merging unit according to the present invention.
Figure 6:
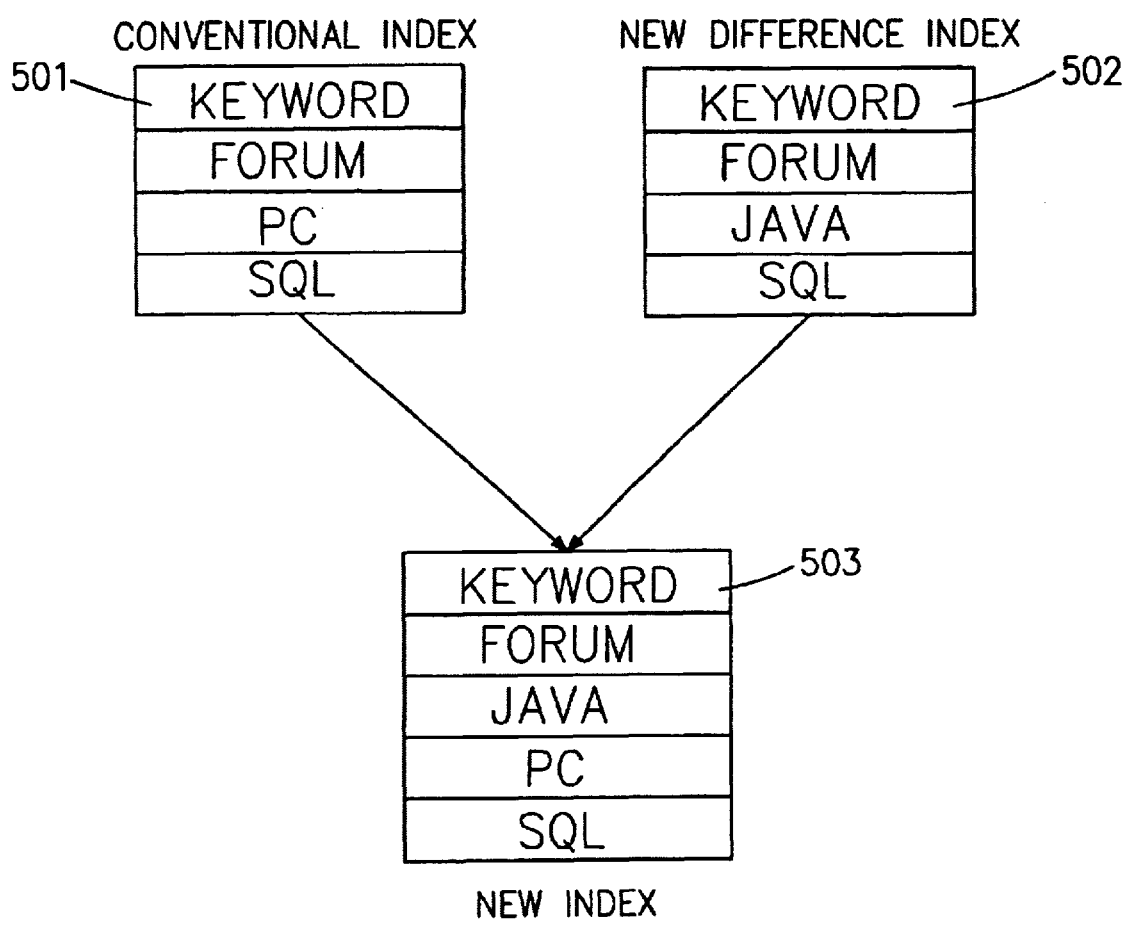
FIG. 6 is a diagram for explaining an example for the merging of key character strings according to the present invention.

The position data deleting process performed by the index merging unit 15 will now be described. FIG. 5 is a flowchart for explaining the position data deletion process performed by the index merging unit 15 of the present invention. FIG. 6 is a diagram for explaining one example of the merging of keywords according to this invention. While referring to FIGS. 5 and 6, first, at step 401 a check is performed to determine whether, for the first time, the sum of the size of a conventional index file and the size of a new difference index file has exceeded size A. When, for the first time, the sum of the files has exceeded size A, process (1) at steps 402 to 406 is performed. When it is not the first time that the sum of the two files has exceeded size A, i.e., when the sum of the two files had also exceeded size A in the past, process (2) at steps 407 to 412 is performed. In this embodiment, the position data deletion process, including processes (1) and (2), is explained; however, the deletion process of this present invention can be carried out by performing only 1 of the processes (1) and (2).

Process (1):

When the sum of the size of the conventional index file and the size of the new difference index file has exceeded size A for the first time, program control moves to step 402. At step 402, keywords are read in order beginning with key files in a conventional index file 501 and a new difference index file 502 in FIG. 6, i.e., in the order employed in a new index file 503 provided by merging the conventional index file 501 and the new difference index file 502. Then, at step 403, a check is performed to determine whether the sum of the position data held by a conventional index file and a new difference file that correspond to the keyword that was read is equal to or greater than B. If the sum of the position data held by these files is not greater than B, program control advances to step 404. If the sum of the position data held by these files is equal to or greater than B, program control advances to step 405. At step 404, to add the keyword to the new index file, the data are written to the key file and the position data file. At step 405, data are not added to the position data file of the new index file, only the entry for the keyword is added to the key file of the new index file, and a corresponding position data delete flag is set to "YES." At step 406, if the keyword that is currently being processed is the last keyword, the merging procedure performed in process (1) is terminated. If the currently processed keyword is not the last one, the process beginning at step 402 is repeated.

Process (2):

If it is not the first time that the sum of the size of the conventional index file and the size of the new difference index file has exceeded the size of A, program control moves to step 407. At step 407, keywords are read in order beginning with the key files in the conventional index file 501 and in the new difference index file 502 in FIG. 6, i.e., in the order of their arrangement in the new index file 503 that is obtained by merging the conventional index file 501 and the new difference index file 502. At step 408, a check is performed to determine whether the sum of the position data held by a conventional index file and that held by a new difference file that correspond to the keyword that was read is equal to or greater than C. If the sum of the position data held by these files is not greater than C, program control advances to step 409. If the sum of the position data held by these files is equal to or greater than C, program control advances to step 411. At step 409, the position data delete flag of the key file in the index file before it was merged is examined to determine whether it is set to "YES." If the flag is not set to "YES," program control goes to step 410. If the flag is set to "YES," program control moves to step 411. At step 410, to add the keyword to the new index file, the data are written to the key file and the position data file. At step 411, data are not added to the position data file of the new index file, only the entry for the keyword is added to the key file of the new index file, and a corresponding position data delete flag is set to "YES." At step 412, if the keyword that is currently being processed is the last keyword, the merging procedure in process (2) is terminated. If the currently processed keyword is not the last one, the process beginning at step 407 is repeated.

The operation performed by the search unit 17 will now be described. According to the search method that uses the index file of this invention, the structure of the search unit 17 is not specifically prescribed; any conventional structure can be employed. When a search is performed based on the following three search character strings, the present invention can be employed more effectively. The three typical search character strings will now be described.

(1) When a search character string consists of one word:

(2) When an index is prepared by the N-gram method and only one search character string exists:

Assume a search is made for "Nippon Ginko" in an N-gram index file. If position data for "Nippon" is deleted, the pertinent document can not be designated; however, if character strings "Hon Gin" and "Ginko" are searched for, search results close to those for "Nippon Ginko" can be obtained. In other words, a search can be made for a character string that includes a stop word.

(3) When a search character string consists of a plurality of words:

If the size of an index file is greatly increased, considerable system resources are consumed during a search that includes a search character string for which the number of documents found by the search is very large. For a search that uses a plurality of character strings, the search results are returned to the user, with the observation that no computations are performed for a character string for which the number of documents found by the search is equal to or greater than a predetermined number, and for a character string for which position data are deleted. Further, a message is transmitted suggesting that a different character string be employed for the search because too many documents were found for the pertinent character string. As a result, the results can be quickly provided for a search that conventionally requires an extended period of time, and the system resources can be effectively employed.

The above three specific search character strings will now be described in detail.

Figure 7:
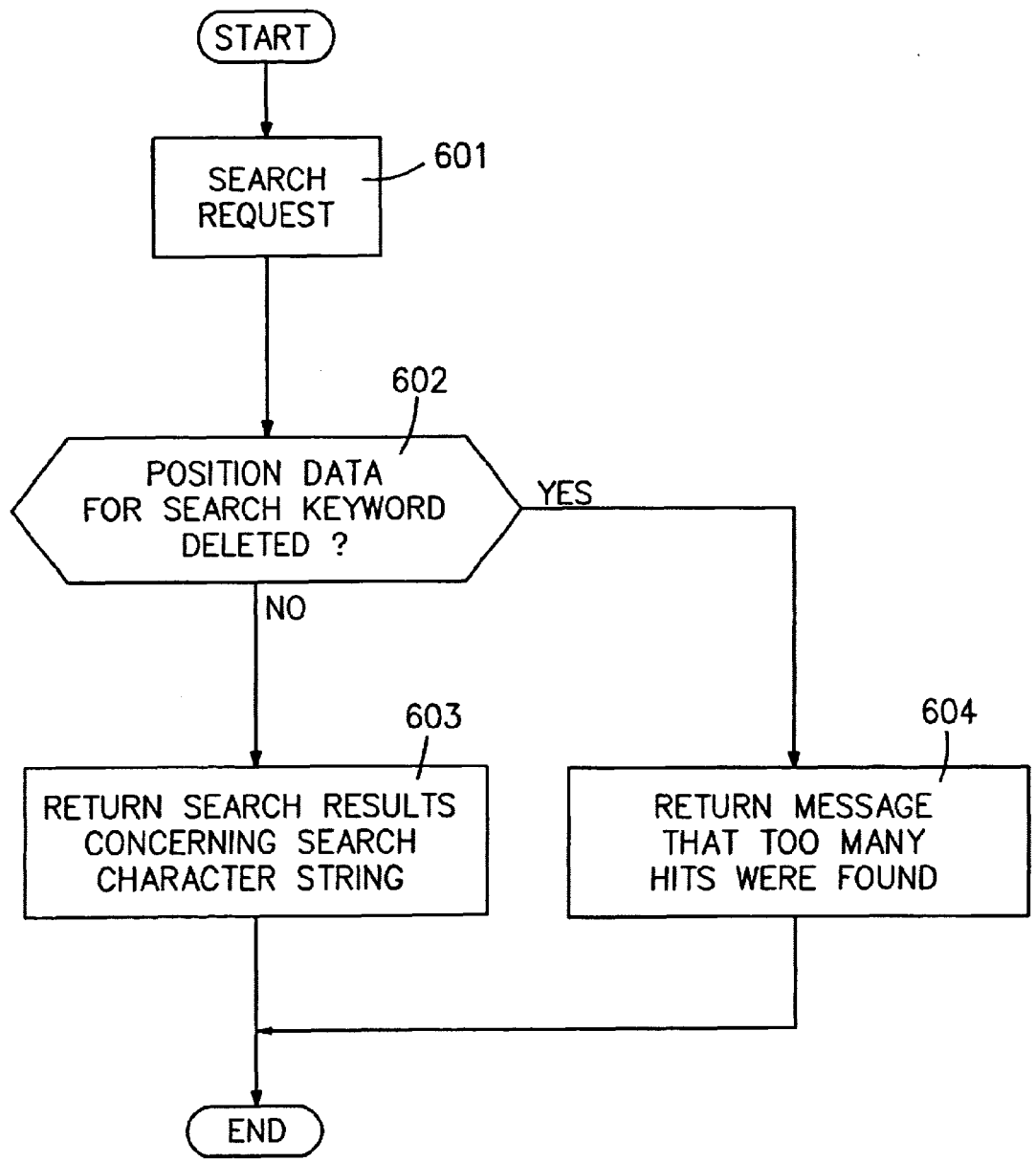
FIG. 7 is a flowchart showing a search process performed when a search character string consists of one word.

(1) When a search character string consists of one word: FIG. 7 is a flowchart showing the search process when a search character string consists of one word. First, at step 601 in FIG. 7 a search character string is accepted, and at step 602 a position data delete flag is examined to determine whether the position data for the search character string have been deleted. If the position data have not been deleted, program control advances to step 603. If the position data have been deleted, program control goes to step 604. At step 603, the character string that corresponds to the search character string is found in the key file, and the contents of a pertinent position data file are returned to a user. At step 604, a message is returned to the user to request a search using another search character string because too many hits were found. The search process is thereafter terminated.

Figure 8:
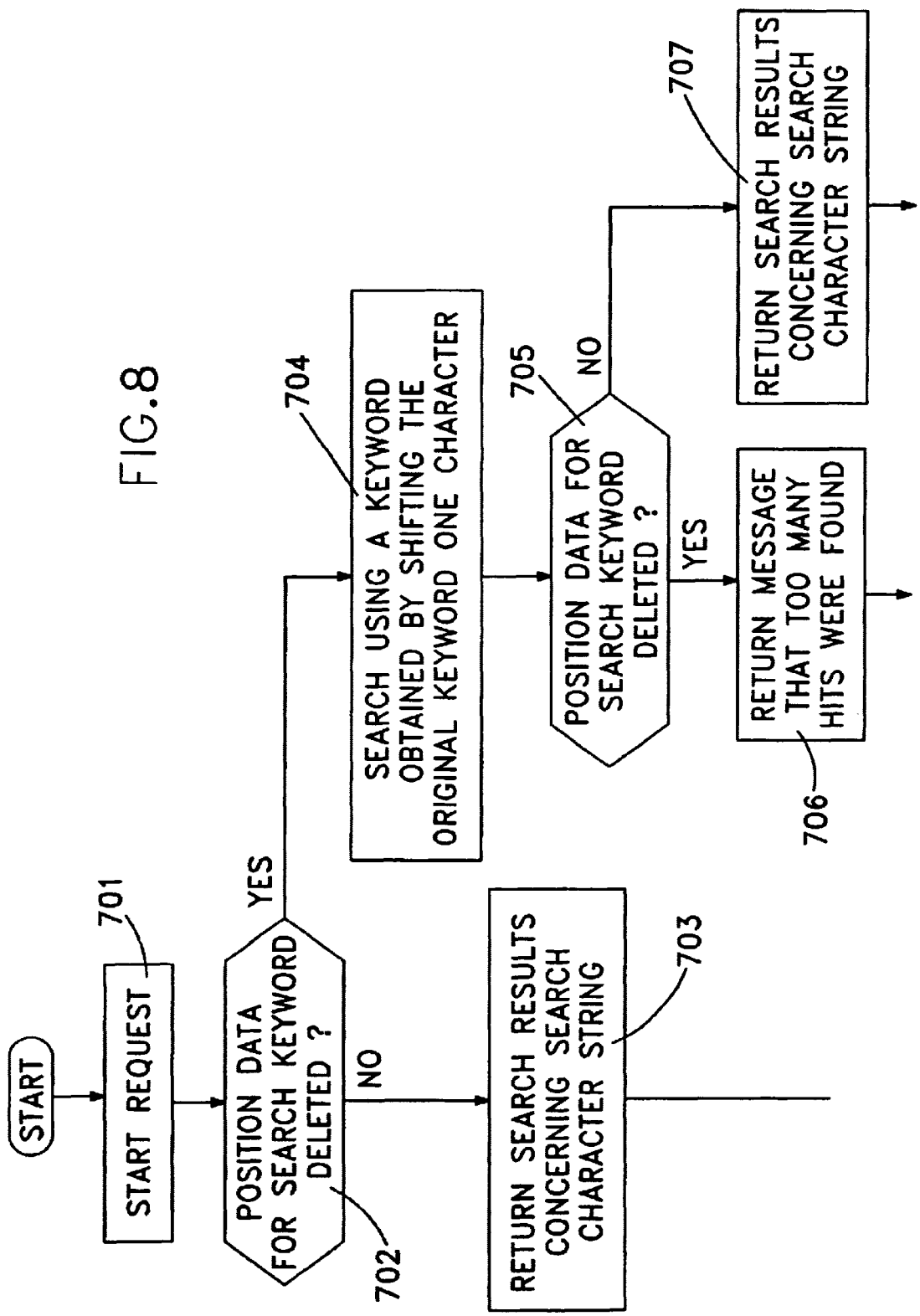
FIG. 8 is a flowchart showing a search process performed when an index is prepared by the N-gram method and there is only one search character string.

(2) When an index is prepared using the N-gram method and only one search character string exists: FIG. 8 is a flowchart showing the search process when an index is prepared using the N-gram method and only one search character string exists. First, at step 701 in FIG. 8 a search character string is accepted, and at step 702 a position data delete flag is examined to determine whether the position data for the search character string have been deleted. If the position data have not been deleted, program control advances to step 703. If the position data have been deleted, program control goes to step 704. At step 703, a search is conducted for the character string that corresponds to the search character string, and the contents of a pertinent position data file are returned to a user. At step 704, a search is conducted by using a character string that is shifted one character from the search character string for which the position data have been deleted. For example, when the search character string, is "Nippon Ginko," at step 703 the search process is initiated with "Nippon" and "Ginko," however, at step 704 the search process is initiated with "Hon Gin" and "Ginko" if the position data for "Nippon" has been deleted. At step 705, the position data delete flag for the search character string "Hon Gin" is examined to determine whether the position data for "Hon Gin" have also been deleted. If the position data have been deleted, program control advances to step 706. If the position data have not been deleted, program control goes to step 707. At step 706, a message is returned to a user to request that a search be performed using another search character string because too many hits were found. At step 707, the results obtained by the search for which "Hon Gin" and "Ginko" were used are transmitted to the user. The search process is thereafter terminated.

(3) When a search character string consists of a plurality of words:

FIG. 9 is a flowchart for explaining the search process performed when a search character string consists of a plurality of words. First, at step 801 in FIG. 9 a search character string is accepted, and at step 802 a position data delete flag for each word of the string is examined to determine whether the position data for each word have been deleted. If the position data have not been deleted, program control advances to step 803. If the position data have been deleted, program control goes to step 804. At step 803, the character string that correspond to the individual search character string are obtained from the key file, and the contents of pertinent position data files are returned to a user. At step 804, a check is performed to determine whether the position data for the entire search character string have been deleted, and if the position data for the entire string have been deleted, program control advances to step 805. If the position data for the entire string have not been deleted, program control advances to step 806. At step 805, a message is returned to the user to request that a search be made using another character string because too many hits have been found. At step 806, the search results are returned to the user, with the observation that no computations are performed for a search character string for which the position data have been deleted. At the same time, for the character string for which the position data have been deleted, a message is returned to the user indicating that too many hits were made. When, for example, a search character string is "FORUM and SQL" and the position data for "FORUM" have been deleted, the search results obtained by using only "SQL" are returned to the user, as is a message indicating too many hits have been found for "FORUM." The search process is thereafter terminated.

In processes (1) and (2), an entire character string is deleted for which the size of the position data that is reached is equal to or greater than B or C. However, in process (1), if B is to be reduced to a degree, for a Japanese newspaper article data, a Japanese character string may be included as a target to be deleted. If the pertinent Japanese string is not to be deleted, it can be so designated that a character string consisting of only Chinese characters, for example, should not be deleted, and thus, position data can be maintained for a character string group for which position data are not supposed to be deleted. Values A, B and C in the above embodiment are not constant values, and arbitrary values can be selected as needed in accordance with the configuration of a system and the performances that are demanded.

As is apparent from the above explanation, according to the present invention, a position data delete flag is correlated with a predetermined key character string, and position data corresponding to the key character string are deleted from a position data file. Specifically, when the size of the overall index file reaches A for the first time, a position data delete flag is set that corresponds to a key character string for which the amount of position data is equal to or greater than B, and the position data are deleted from the position data file. And/or when the size of the entire index file has exceeded A, a position data delete flag is set that corresponds to a key character string for which the amount of position data is equal to or greater than C, and the position data are deleted from the position data file. Therefore, while a request for an all-sentences search is satisfied, position data for a character string that can not be used for the actual search can be deleted, and the size of an index file can be considerably reduced.

What is claimed is:

1. A search method, for using an index file consisting of a key file, which includes key character strings, and a position data file, having position data corresponding to the key character strings, said search method comprising the steps of:

correlating a position data delete flag with a specific key character string; and deleting, from said position data file, position data that correspond to said specific key character string, wherein said position data are deleted when the size of the position data, corresponding to said specific key character string, reaches a specific ratio.

2. The search method according to claim 1, wherein the structure of a key file is constituted by a key character string, the location of said key character string in said position data file, the size of said position data, and said position data delete flag.

3. The search method according to claim 1, wherein a group of key character strings is specified in advance, for which position data are not to be deleted.

4. The search method according to claim 1, wherein a search is to be performed by one of the group consisting of a method that uses a search key character string consisting of one word, a method that uses one search key character string when an index is prepared using the N gram method, and a method that uses using a search key character string consisting of a plurality of words.

5. A search method for using an index file consisting of a key file, which includes key character strings, and a position data file, having position data corresponding to the key character strings, said search method comprising the steps of:

correlating a position data delete flag with a specific key character string; and deleting, from said position data file, position data that correspond to said specific key character string, wherein said position data are deleted when the size of said position data reaches a specific value that corresponds to said specific key character string.

6. The search method according to claim 5, wherein the structure of a key file is constituted by a key character string, the location of said key character string in said position data file, the size of said position data, and said position data delete flag.

7. The search method according to claim 5, wherein a group of key character strings is specified in advance, for which position data are not to be deleted.

8. The search method according to claim 5, wherein a search is to be performed by one of the group consisting of a method that uses a search key character string consisting of one word, a method that uses one search key character string when an index is prepared using the N gram method, and a method that uses using a search key character string consisting of a plurality of words.

9. A search method, for using an index file consisting of a key file, which includes key character strings, and a position data file, having position data corresponding to the key character strings, said search method comprising the steps of:

correlating a position data delete flag with a specific key character string; and deleting, from said position data file, position data that correspond to said specific key character string, wherein, when said position data delete flag corresponding to a specific key character string, is set, position data for said key character string is not added to said position data file for said index file; and wherein, when said position data delete flag, corresponding to a specific key character string, is not set, position data for said key character string is added to said position data file for said index file.

10. The search method according to claim 9, wherein said position data are deleted when the size of the position data, corresponding to said specific key character string, reaches a specific ratio.

11. The search method according to claim 9, wherein said position data are deleted when the size of said position data reaches a specific value that corresponds to said specific key character string.

12. The search method according to claim 9, wherein the structure of a key file is constituted by a key character string, the location of said key character string in said position data file, the size of said position data, and said position data delete flag.

13. The search method according to claim 9, wherein a group of key character strings is specified in advance, for which position data are not to be deleted.

14. The search method according to claim 9, wherein a search is to be performed by one of the group consisting of a method that uses a search key character string consisting of one word, a method that uses one search key character string when an index is prepared using the N gram method, and a method that uses using a search key character string consisting of a plurality of words.

15. An apparatus comprising:

a new difference index preparation unit for preparing a new difference index file using a newly registered document, said index file consisting of a key file, which includes key character strings, and a position data file, having position data corresponding to the key character strings;

an index merge unit for merging a conventional index file with said new difference index file prepared by said new difference index preparation unit, for determining whether a position data file is to be deleted by the steps of correlating a position data delete flag with a specific key character string; and deleting, from said position data file, position data that correspond to said specific key character string, and wherein said position data are deleted when the size of the position data, corresponding to said specific key character string, reaches a specific ratio, and for preparing a new index file; and a search unit for beginning a search based on said new index file generated by said index merge unit.

16. A program storage device readable by machine, tangibly embodying a program of instructions executable by the machine to perform method steps for using an index file consisting of a key file, which includes key character strings, and a position data file, having position data corresponding to the key character strings, said search method comprising the steps of:

correlating a position data delete flag with a specific key character string; and deleting, from said position data file, position data that correspond to said specific key character string, wherein said position data are deleted when the size of the position data, corresponding to said specific key character string, reaches a specific ratio.

17. A program storage device readable by machine, tangibly embodying a program of instructions executable by the machine to perform method steps for using an index file consisting of a key file, which includes key character strings, and a position data file, having position data corresponding to the key character strings, said search method comprising the steps of:

correlating a position data delete flag with a specific key character string; and deleting, from said position data file, position data that correspond to said specific key character string, wherein said position data are deleted when the size of said position data reaches a specific value that corresponds to said specific key character string.

18. A program storage device readable by machine, tangibly embodying a program of instructions executable by the machine to perform method steps for using an index file consisting of a key file, which includes key character strings, and a position data file, having position data corresponding to the key character strings, said search method comprising the steps of:

correlating a position data delete flag with a specific key character string; and deleting, from said position data file, position data that correspond to said specific key character string, wherein, when said position data delete flag corresponding to a specific key character string, is set, position data for said key character string is not added to said position data file for said index file; and wherein, when said position data delete flag, corresponding to a specific key character string, is not set, position data for said key character string is added to said position data file for said index file.

19. An apparatus comprising:

a new difference index preparation unit for preparing a new difference index file using a newly registered document, said index file consisting of a key file, which includes key character strings, and a position data file, having position data corresponding to the key character strings;

an index merge unit for merging a conventional index file with said new difference index file prepared by said new difference index preparation unit, for determining whether a position data file is to be deleted by the steps of correlating a position data delete flag with a specific key character string; and deleting, from said position data file, position data that correspond to said specific key character string, and wherein said position data are deleted when the size of said position data reaches a specific value that corresponds to said specific key character string, and for preparing a new index file; and a search unit for beginning a search based on said new index file generated by said index merge unit.

20. An apparatus comprising:

a new difference index preparation unit for preparing a new difference index file using a newly registered document, said index file consisting of a key file, which includes key character strings, and a position data file, having position data corresponding to the key character strings;

an index merge unit for merging a conventional index file with said new difference index file prepared by said new difference index preparation unit, for determining whether a position data file is to be deleted by the steps of correlating a position data delete flag with a specific key character string; and deleting, from said position data file, position data that correspond to said specific key character string, and wherein, when said position data delete flag corresponding to a specific key character string, is set, position data for said key character string is not added to said position data file for said index file; and wherein, when said position data delete flag, corresponding to a specific key character string, is not set, position data for said key character string is added to said position data file for said index file, and for preparing a new index file; and a search unit for beginning a search based on said new index file generated by said index merge unit.

\* \* \* \* \*